United States Patent

McNeil et al.

[11] Patent Number: 5,987,117
[45] Date of Patent: Nov. 16, 1999

[54] METHOD OF DYNAMIC LOAD SHARING BETWEEN SYSTEMS WITH AUTOMATIC TELEPHONE CALL DISTRIBUTORS

[75] Inventors: Douglas McNeil, Ottawa; Steven P. Pequegnat, Stittsville, both of Canada

[73] Assignee: Mitel Corporation, Kanata

[21] Appl. No.: 08/888,618

[22] Filed: Jul. 7, 1997

[51] Int. Cl.⁶ .................................................. H04M 3/00
[52] U.S. Cl. ........................................ 379/265; 379/266
[58] Field of Search .................................. 379/265, 266, 379/309, 111, 113, 133, 219; 370/353, 354

[56] References Cited

U.S. PATENT DOCUMENTS

| | | | |
|---|---|---|---|
| 4,400,587 | 8/1983 | Taylor et al. | 379/266 |
| 5,299,259 | 3/1994 | Otto | 379/266 |
| 5,335,268 | 8/1994 | Kelly, Jr. et al. | 379/265 |
| 5,450,482 | 9/1995 | Chen et al. | 379/265 |
| 5,452,350 | 9/1995 | Reynolds et al. | 379/265 |
| 5,524,147 | 6/1996 | Bean | 379/265 |
| 5,592,542 | 1/1997 | Honda et al. | 379/265 |
| 5,740,238 | 4/1998 | Flockhart et al. | 379/266 |

FOREIGN PATENT DOCUMENTS

| | | |
|---|---|---|
| 0 526 103 | of 1993 | European Pat. Off. . |
| 2 283 390 | of 1995 | United Kingdom . |

*Primary Examiner*—Krista Zele
*Assistant Examiner*—Benny Q. Tieu
*Attorney, Agent, or Firm*—Pascal & Associates

[57] ABSTRACT

A method of sharing a load of incoming calls to a first automatic call distribution (ACD) system with a second ACD system, comprising: establishing at each of the first and second ACD systems divert start service levels each comprising an average wait time of incoming calls before being answered of a predetermined number of incoming calls during a sample period, monitoring a local service level at each of the ACD systems, and diverting incoming calls from one of the ACD systems to the other of the ACD systems for answering thereof in the event the local service level of the one of the ACD systems is longer than its local divert start service level.

3 Claims, 2 Drawing Sheets

Load Sharing Monitor

Status Control

Status: Operational

|  | Bedford | Rayleigh |
|---|---|---|
| Network Group: | | |
| Name & DN: | Net Service - 2000 | Net Service - 3000 |
| Active Agents: | 24 | 16 |
| Calls Waiting: | 2 | 1 |
| Longest Call Waiting: | 00:30 | 01:20 |
| Calls Diverted In: | 75 | |
| Routing Digits: | | 827777 |
| Primary Group: | | |
| Name & DN: | Service - 2000 | Service - 3000 |
| Service Level: | 10 secs/call | 42 secs/call |
| Active Agents: | 24 | 16 |
| Calls Waiting: | 3 | 2 |
| Longest Call Waiting: | 02:30 | 00:20 |
| Calls Diverted Out: | | 75 |
| Divert Start SL: | 40 | 40 |
| Divert Stop SL: | 21(50%) | 20(50%) |

METHOD OF DYNAMIC LOAD SHARING BETWEEN SYSTEMS WITH AUTOMATIC TELEPHONE CALL DISTRIBUTORS

FIELD OF THE INVENTION

This invention relates to telephones systems and in particular to an automatic call distribution (ACD) system.

BACKGROUND TO THE INVENTION

ACD systems are systems used in conjunction with a telephone switching system for routing incoming calls to any of a group of agents. Such systems are typically used to handle incoming calls to airline reservation offices, telephone company order desks, customer service departments for department stores, cable, telephone or credit card companies, etc. Telephones used by agents are typically grouped in hunt groups, and an ACD supervisor system distributes incoming calls equally among the agents of the group. If there are more incoming calls than available agents, the calls are routed to recordings, and are queued. Calls that are queued are routed to an agent as soon as one becomes available.

It has been found that sometimes the volume of calls is so high that the waiting time for a call to be answered is excessive, and callers become frustrated. This can cause callers to hang up, and create bad customer relations, which can ultimately result in lost sales.

SUMMARY OF THE INVENTION

The present invention substantially alleviates the length of queues of callers waiting for their calls to be answered, by dynamically sharing the load of the overloaded ACD system with another ACD system of another telephone system. In preferred embodiments, special techniques are used to ensure that the ACD systems do not enter an endless loop of handing calls off to each other, which could otherwise happen if each is overloaded or is caused to be overloaded by the calls routed to the other.

In accordance with an embodiment of the invention, a method of sharing a load of incoming calls to a first automatic call distribution (ACD) system with a second ACD system, comprises: (a) establishing at each of the first and second ACD systems divert start service levels, each comprising an average wait time of incoming calls before being answered, of a predetermined number of incoming calls during a sample period, (b) monitoring a local service level at each of the ACD systems, and (c) diverting incoming calls from one of the ACD systems to the other of the ACD systems for answering thereof in the event the local service level of the one of the ACD systems is longer than its local divert start service level.

In accordance with another embodiment, the above method further includes establishing at each of the first and second ACD systems a divert stop service level which is lower than its divert start service level, and blocking acceptance of calls diverted from the other ACD system in the event the local service level is above the local divert stop service level.

BRIEF INTRODUCTION TO THE DRAWINGS

A better understanding of the invention will be obtained by considering the detailed description below, with reference to the following drawings, in which:

FIG. 1 is a block diagram of a system on which the present invention can be operated, and FIG. 2 is an illustration of data provided on a display, dealing with important data used in the system.

DETAILED DESCRIPTION OF PREFERRED EMBODIMENT

Figure 1:
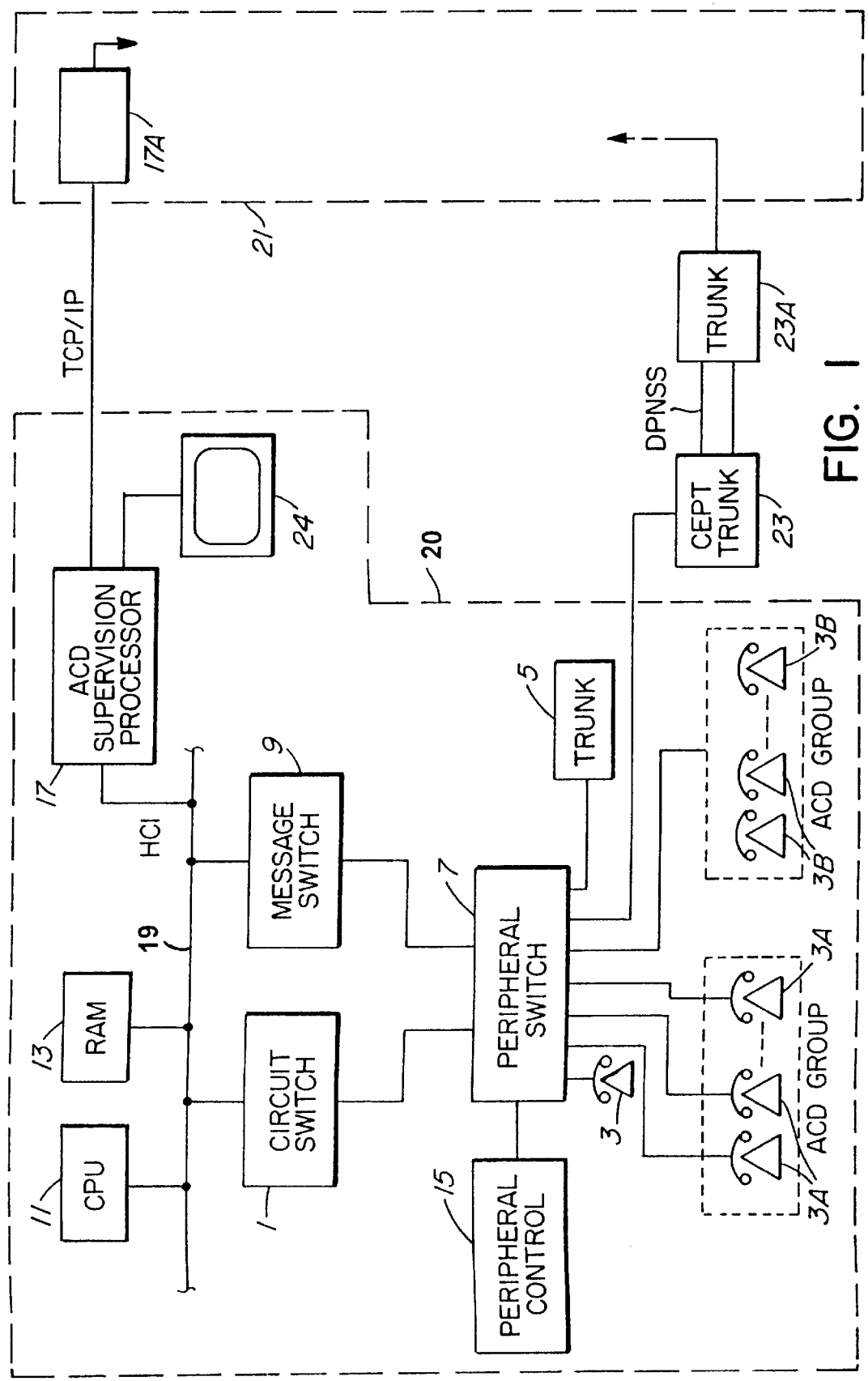

FIG. 1 illustrates the main components of a telephone system such as described in U.S. Pat. No. 4,510,597 issued Apr. 9, 1985 invented by Conrad Lewis, entitled TIME DIVISION SWITCHING MATRIX, U.S. Pat. No. 4,615,028 issued Sep. 30, 1986, invented by Conrad Lewis et al entitled SWITCHING SYSTEM WITH SEPARATE SUPERVISORY LINKS and U.S. Pat. No. 4,616,360 issued Oct. 7, 1986, invented by Conrad Lewis entitled PERIPHERAL CONTROL FOR A DIGITAL TELEPHONE SYSTEM. The system is comprised of a circuit switch subsystem 1 which switches lines between telephone sets 3 and trunks 5 the circuits of which pass through peripheral subsystem 7, and a message switch 9 which switches control signals between a central processor (CPU) 11 operating under control of programs stored in random access memory 13 and a peripheral control 15 which controls peripheral switch 7, for example. Operation of this system is well known and a more detailed description of its operation is believed to be redundant for that reason.

An ACD system used in conjunction with the telephone system described above is comprised of groupings of telephone sets such as 3A and 3B into hunt groups, the telephone sets being used by agents. Typically when agents appear for work, they log onto the system by going off hook on their local set, and dialing a logon number identifying themselves. An ACD supervision processor 17, communicating with the CPU 11 via an HCI communication link to main bus 19 of the system, controls the distribution of incoming calls to various ones of the sets 3A and 3B. An HCI link is described in U.S. Pat. No. 5,007,080 issued Apr. 9, 1991, invented by Ian MacMillan et al and entitled COMMUNICATION SYSTEM SUPPORTING REMOTE OPERATIONS.

For example, for an incoming call received from e.g. a trunk 5 dialed to a particular directory number for which there is ACD, the CPU 11 checks the dialed number in a local database stored in RAM 13 (or in another memory which can be in communication with the CPU) to determine whether the set to which the incoming call is to be directed is to be controlled by the ACD processor 17. If it is, the number is provided to the ACD processor by the CPU, which checks the busy/idle status, backlog and past distribution history of the logged-in sets 3A and/or 3B, and sends a message to the CPU as to which set the call is to be routed. The CPU then controls the system in the usual manner to connect the incoming call to the correct set.

The ACD set groups 3A and 3B can be used by agents providing different services, for example responding to different product requests offered by the same retailer. If one group becomes overloaded, it can assign some of the sets 3B to the group 3A, for example. In this manner the system could avoid one of the agent groups becoming overloaded.

However, sometimes both agent groups (or a single agent group, if only one exists) can become overloaded. If that was the case the only recourse the system could rely on was to retain the waiting calls on different recorded announcements based on waiting time to try to retain the patience of the waiting caller, or drop calls. Neither option has been found to be satisfactory.

In the present invention, call loads can be dynamically shared between plural ACD systems.

The system described above is shown by reference numeral 20. Another similar system, with an ACD system for dynamic load sharing with system 20 is shown by reference numeral 21. In system 21 an ACD processor 17A is connected to the ACD processor 17 of system 20. The link between these processors is a link which carries data, control and signaling signals between them preferably using the Transmission Control Protocol/Internet Protocol TCP/IP protocol.

A special link, labeled DPNSS (digital private network signaling system) links trunk 23 of system 19, which is connected to the peripheral switch 7, with trunk 23A of system 21, which is connected to the corresponding peripheral switch (not shown) of system 21. The DPNSS link is a CEPT trunk, which is treated by each of the systems 19 and 21 as if what is connected to their opposite ends were part of the same system.

ACD processor 17 dynamically transmits information to and receives information from processor 17A, as will be described below. When ACD processor 17 determines that the load to be distributed to agent sets 3A and/or 3B is too great, it advises the CPU 11 that the location to route an incoming call to is trunk 23. The CPU controls the circuit switch 1 and the peripheral switch 7 by well known means to route the incoming call to trunk 23.

Trunk 23 is connected to trunk 23A, which is recorded at the ACD processor of system 21 as an ACD network node, to be handled by local agents as a network service. The incoming call is identified by the local CPU, which conveys the information to the local ACD processor. The local ACD processor recognizes the identity of the incoming call as being an ACD network call, and instructs the local CPU as to the identity of the agent set in system 21 to which the call is to be routed. The CPU then causes the call, which has passed from e.g. an incoming trunk on system 20, through peripheral switch 7, possibly through circuit switch 1 and peripheral switch 7 to trunk 23 and trunk 23A via the DPNSS link, to be routed to the designated agent set in system 21 to be answered.

System 20 operates in a similar manner, for ACD calls routed from system 21.

The nature of the link between ACD processors and the information passed between them is important to the operation of the present invention. It should be recognized that the processors 17 and 17A must be able to determine when calls should be routed to one another. More particularly, if this is known, a situation can arise when both systems 20 and 21 are in a state wherein one could route incoming calls to the other, and the other either is placed in a state, or is in a state, wherein calls are routed from the other to the one system. The an embodiment of the present invention avoids this situation.

Each of the ACD processors 17 and 17A include a database in a memory which retains ACD call information and service level thresholds as will be described below. This information is transmitted via the TCP/IP link between them, one to the other. The information can be displayed to an operator via a monitor 24 which is connected to the processor 17 (17A). A representative display on the monitor 24 is shown in FIG. 2.

A first threshold is referred to as a divert start service level. This value can be, for example, the numeral 40, meaning 40 seconds unanswered incoming call delay as being the threshold above which incoming calls are to be diverted to the remote ADC system.

Thus in FIG. 2, the status of the local (Bedford) ACD system is shown, both the network values and the primary (non-network) group values. For the case noted above, the divert start service level (SL) for the primary group is shown as 40 seconds. For the remote (Rayleigh) ACD system the primary group divert start SL is also shown as 40 seconds.

The actual service levels are also shown for both ACD systems. For the Bedford system, the data measured and provided by the local ACD system to the display is that there are 24 active agents, there are 3 unanswered calls waiting, and the longest unanswered call has waited 2 minutes and 30 seconds. The ACD system also measures the average waiting time before answering over a predetermined period such as 5 minutes, (i.e. adding the number of ACD calls during that time to a total, and separately totaling the times between receipt of the requests for service and actual answering of those calls, divided by the number of incoming ACD calls during the period).

In the case of the Bedford system, the service level is 10 seconds per call. However, it may be seen that for the Rayleigh system, the service level is 42 seconds per call. This is in excess of the divert start service level SL. The ACD system thus provides data to the local CPU 11 to divert calls from the Rayleigh ACD system via the DPNSS link as described above, to the Bedford system.

As shown in FIG. 2, there have been 75 calls diverted out of the Rayleigh system to the Bedford system. The network group data of the Bedford system is shown on the display as 75 calls diverted in, corresponding to the 75 calls diverted out of the Rayleigh system. The Bedford system shows that the longest waiting diverted ACD call has been waiting for 30 seconds, and that there are only 2 diverted calls waiting unanswered. The display also shows that the number of active agents in the Bedford system for diverted calls is 24, the same agents as for the primary (non-diverted) group. The number of active agents in the Rayleigh system for diverted calls in is 16, the same agents as for the primary (non-diverted) group.

With the diversion from Rayleigh to Bedford, the longest waiting call at Rayleigh is 20 seconds, in the primary group. However, the Bedford system had previously routed a call or calls to the Rayleigh system, and the number of diverted calls waiting to be answered is 1, and it has been waiting for 1 minute and 20 seconds to be answered, as shown in the network service portion of the display for Rayleigh.

It is preferred to illustrate by means of an icon, for example, the current dynamic operational status. Thus, with the service level (42 secs/call) at Rayleigh having exceeded the divert start SL (40 secs/call at Rayleigh), the current service level could be shown by contrasting color, or italics (as shown). In addition an outgoing arrow icon is shown in the Rayleigh part of the display to show that it is currently in an outgoing diversion state. An incoming arrow icon is shown in the Bedford part of the display to show that it is currently in a state of receiving incoming diverted calls.

While the above operates to provide a dynamic load sharing function, it is possible that the load of incoming calls is so high that both systems would be caused to divert to the other, creating circular and unstable operation, or a hand-off situation in which all calls to one system are answered by the other. For that reason a divert stop service level is established, which sets a threshold at or above which diversion is blocked. As shown in FIG. 2, the divert stop level is 21 seconds per call for the Bedford system, and the divert stop level is 20 seconds per call for the Rayleigh system.

The divert stop service level is the level at the distant system which causes the local system to stop diverting calls to it. Thus if the local service level at the Bedford system is in excess of 21 seconds, the Rayleigh system would be caused to stop diverting calls to the Bedford system (i.e. the Bedford system would block diversion or a further diversion of calls from the Rayleigh system to the Bedford system). In the case shown, the service level at the Bedford system is 10 seconds per call, considerably lower than its divert stop service level, and therefore there is no blockage of diversion from the Rayleigh system.

The service level of the Rayleigh system is 42 seconds per call, larger than the divert stop service level at the Rayleigh system (20 seconds), which causes the Rayleigh ACD system to block diversion of calls from the Bedford system to the Rayleigh system.

The information shown in the display of FIG. 2 is provided from each of the ACD processors to the other via the TCP/IP link (preferably 19.2 Kbaud or greater). Thus each of the ACD processors has record of the divert stop service level of the other.

The divert stop service level is determined using a divert exclusion percentage (DEP), which is a percentage poorer service level at the remote site relative to the service level at the local site. This value should be 50% or higher, to avoid the circular and unstable operation, or the hand-off situation referred to earlier.

The divert stop service level is calculated only when the local site's service level is above the divert start service level, as follows:

$$LSL-((LSL)*DEP)/100,$$

where

LSL is the local service level and

DEP is the divert exclusion percentage (50% in FIG. 2).

The divert stop service level is calculated dynamically when the call diversion process in the ACD has a call to divert.

If the site's service level is below the divert start service level, the calculation is based on the divert start service level.

It should be noted that the divert start service level, the divert exclusion percentage DEP, the service level sample period, and a divert wait interval are settable by the system administrator at the time of initialization of each system.

Incoming calls to a system are queued at the primary group, as in a normal ACD system. These calls begin aging when they are queued. After a call ages past a divert wait interval, a call divert process is triggered, if the service level of the local system has reached or exceeds the divert start service level. If it has not, it remains in the queue.

If the service level of the local system has reached or exceeds the divert start service level, the aged calls are candidates for diversion to the remote network group in the remote system. However the call divert process operated by the ACD processor determines the following, and should not divert a call under any of the following circumstances:

1. Both local and remote systems are not initializing, and are in ready states;
2. The remote system is not diverting calls to the local system;
3. The remote system network system is not in a "do not divert" state; or
4. The service level of the remote site is not at or exceeding the divert stop service level.

The calculation of the divert stop service level is performed when the local system is above the divert start service level. Otherwise the calculation is based on the divert start service level.

If the call diverter process determines that a call can be diverted, it attempts to do so preferably using the method and structures described earlier. If the divert attempt is not successful, it will not attempt more than the one time, and the call remains queued in the primary group. Diversion attempts may be unsuccessful due to glare or race conditions (e.g. a call is answered while a divert attempt is being made).

It should be noted that the divert start service levels, the number of calls and the sample period to determine the average wait time of those calls, and the divert exclusion levels should be the same for both systems. Also, the divert exclusion levels at both systems should be no smaller than 50%.

It is also preferred that a refresh rate of the display should be set at about 5 seconds, in real time.

It will be recognized that while only two systems have been described, dynamic load sharing can be done using more than the two systems described, using the principles described herein. Sharing can be effected by the various ACD processors deciding to load share to a particular one of plural other systems depending on which has reported a best service level relative to the others, for example.

The system described above has demonstrated considerable relief for a busy ACD system, particularly where one system is far removed from the other, such as in different areas or cities. The result clearly is more satisfied callers, and more efficient use of resources.

A person understanding this invention may now conceive of alternative structures and embodiments or variations of the above. All those which fall within the scope of the claims appended hereto are considered to be part of the present invention.

We claim:

1. A method of sharing a load of incoming calls to a first automatic call distribution (ACD) system with a second ACD system, comprising:

(a) establishing at each of the first and second ACD systems divert start service levels each comprising an average wait time of a predetermined number of incoming calls before being answered during a sample period, (b) monitoring a local service level at each of the ACD systems, (c) diverting incoming calls from one ACD system to the other ACD system in the event the local service level of said one of the ACD systems is longer than its local divert start service level, including establishing at each of the first and second ACD systems a divert stop service level which is lower than its divert start service level, and blocking acceptance of calls diverted from another ACD system in the event the local service level is above the local divert stop service level, in which the divert start service level, the predetermined number of calls, and divert exclusion percentage (DEP) is the percentage poorer service level at a remote ACD system relative to a service level at the local ACD system, are similar at both the local and remote ACD systems, and in which the DEP is 50% or higher at both the local and remote ACD systems.

2. A method as defined in claim 1 in which the divert stop service level at an ACD system is determined as $$LSL-(LSL*DEP)/100$$

where LSL is the local service level,
    and DEP is the divert exclusion percentage.

3. A method as defined in claim 1 including entering an incoming call in a local queue for answering in the event diversion to another ACD system has been blocked.

* * * * *